(12) United States Patent
Ishigami et al.

(10) Patent No.: US 10,953,885 B2
(45) Date of Patent: Mar. 23, 2021

(54) ROAD SURFACE DETECTING APPARATUS

(71) Applicants: TOYOTA JIDOSHA KABUSHIKI KAISHA, Toyota (JP); DENSO CORPORATION, Kariya (JP)

(72) Inventors: Hirotake Ishigami, Okazaki (JP); Naohide Uchida, Numazu (JP); Ken Tanabe, Kariya (JP); Masaki Kuwahara, Nukata-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 166 days.

(21) Appl. No.: 16/144,556

(22) Filed: Sep. 27, 2018

(65) Prior Publication Data

US 2019/0100215 A1 Apr. 4, 2019

(30) Foreign Application Priority Data

Sep. 29, 2017 (JP) .............................. JP2017-191566

(51) Int. Cl.
*B60W 40/06* (2012.01)
*G06K 9/00* (2006.01)
(Continued)

(52) U.S. Cl.
CPC ............ *B60W 40/06* (2013.01); *B60W 30/09* (2013.01); *G06K 9/00791* (2013.01);
(Continued)

(58) Field of Classification Search
CPC .... B60W 40/06; B60W 30/09; B60W 40/076; B60W 2420/42; G06T 7/593; G06T 7/42;
(Continued)

(56) References Cited

U.S. PATENT DOCUMENTS

2012/0185167 A1* 7/2012 Higuchi ................ G06T 7/70
701/461
2016/0203376 A1* 7/2016 Ishigami ............... G06T 7/292
382/103
(Continued)

FOREIGN PATENT DOCUMENTS

JP 2013-164351 A 8/2013
JP 2016-206776 A 12/2016

OTHER PUBLICATIONS

Simon Baker et al., "Lucas-Kanade 20 Years On: A Unifying Framework", International Journal of Computer Vision, 2004, pp. 221-255, vol. 56, No. 3.
(Continued)

*Primary Examiner* — Navid Ziaeianmehdizadeh
(74) *Attorney, Agent, or Firm* — Sughrue Mion, PLLC

(57) ABSTRACT

A road surface detecting apparatus comprises a camera sensor 11 for taking images of a region in front of a vehicle, and an electronic control unit (ECU) configured to: calculate, based on a taken image, parallax information including a parallax of each pixel composing the taken image; extract a pixel corresponding to a road surface from the taken image; acquire, based on information of the extracted pixel, information-indicating-a-road-surface; calculate, based on the information-indicating-a-road-surface, a road surface gradient formula by approximating a gradient of the road surface by a quadratic function; determine whether or not an absolute value of a coefficient of a quadratic term of this formula is greater than a coefficient threshold; and invalidate the information-indicating-a-road-surface when the absolute value is determined to be greater than the threshold.

3 Claims, 6 Drawing Sheets

(51) Int. Cl.
*B60W 30/09* (2012.01)
*G06T 7/42* (2017.01)
*G06T 7/593* (2017.01)

(52) U.S. Cl.
CPC ............ *G06K 9/00798* (2013.01); *G06T 7/42* (2017.01); *G06T 7/593* (2017.01); *G06T 2207/30256* (2013.01)

(58) Field of Classification Search
CPC ...... G06T 2207/30256; G06K 9/00798; G06K 9/00791
See application file for complete search history.

(56) References Cited

U.S. PATENT DOCUMENTS

| | | | |
|---|---|---|---|
| 2016/0305785 A1 | 10/2016 | Nishijima et al. | |
| 2017/0261315 A1* | 9/2017 | Yamaguchi | G08G 1/16 |
| 2019/0139177 A1* | 5/2019 | Hasebe | G08G 1/16 |
| 2019/0152487 A1* | 5/2019 | Tokuhiro | G06K 9/623 |

OTHER PUBLICATIONS

I. Haller et al., "Real-time semi-global dense stereo solution with improved sub-pixel", 2010 IEEE Intelligent Vehicles Symposium, Jun. 21-24, 2010, pp. 369-376, University of California, San Diego, CA, USA.

* cited by examiner before being invalidated after being invalidated

ROAD SURFACE DETECTING APPARATUS

TECHNICAL FIELD

The present invention relates to a road surface detecting apparatus for detecting (that is, acquiring information-indicating-a-road-surface) a road surface existing in front of a vehicle.

BACKGROUND ART

Collision avoidance control has been conventionally performed as one embodiment of driving support, the collision avoidance control being a control for avoiding a collision with an obstacle existing in front of a vehicle or for reducing an impact due to the collision. The collision avoidance control is a control to perform at least one of following controls, that is, a warning control for raising a warning to a driver, an automatic braking control for automatically applying a braking force on the vehicle, and an automatic steering control for automatically changing a steered angle of a steered wheel of the vehicle. Each of these controls is performed when there exists an obstacle in front of the vehicle with a possibility of colliding with the vehicle.

In a case when the automatic steering control which is one of the collision avoidance control is to be performed, an avoidance route for avoiding a collision with an obstacle is set in advance, and the vehicle is controlled so as to travel along this avoidance route. If an avoidance route is set within a region inappropriate as a road surface on which a vehicle travels, the automatic steering control will not be conducted in a proper manner. Therefore, it has been desired to develop an apparatus for a vehicle capable of detecting a road surface suitable for traveling with a high accuracy.

For example, a road surface detecting apparatus disclosed in the Japanese Patent Application Laid-Open (kokai) No. 2016-206776 (hereinafter, referred to as a "prior art apparatus"), estimates, based on a parallax image acquired by a taken image in front of a vehicle, whether or not each of parallax points composing this parallax image is a parallax point corresponding to a road surface (Hereinafter, such a parallax point may be referred to as a "road surface parallax point".). Thereafter, the prior art apparatus estimates, based on a vehicle speed, a yaw rate, and the like, a travelling expected route on which the vehicle is expected to travel and weights each of the road surface parallax points, depending on a distance thereof to the travelling expected route.

More specifically, as a distance from a certain road surface parallax point to a travelling expected route becomes close, this parallax point is more heavily weighted. The prior art apparatus detects a road surface based on weighted road surface parallax points. It should be noted that in the Japanese Patent Application Laid-Open (kokai) No. 2016-206776, a road surface parallax point and a travelling expected route are expressed as a "road surface candidate point" and a "progress locus", respectively.

A region close to a travelling expected route has a higher probability of being a road than a region far from the travelling expected route. Thus, it is described in the Japanese Patent Application Laid-Open (kokai) No. 2016-206776 that by more heavily weighting road surface parallax points close to a travelling expected route compared to road surface parallax points far from the travelling expected route, the parallax points close to the travelling expected route are able to have a relatively large influence on a detection of a road surface, and thus a road surface can be detected with a high accuracy.

SUMMARY OF THE INVENTION

However, according to the configuration of the prior art apparatus, there is a possibility that a region which actually is not a road surface may be falsely detected as a road surface. That is, for example, in a case where snow is accumulated during snow removal in such a manner that the snow covers an obstacle and the accumulated snow moderately joins with a road surface, even though a gradient change of the accumulated snow is relatively large (that is, even though a gradient relatively rapidly changes), the prior art apparatus may detect the accumulated snow as a road surface, not an obstacle. In other words, even though a gradient change of a target object is relatively large, the target object being subject to be determined whether or not to be a road surface, the prior art apparatus may detect this target object as a road surface, not an obstacle, depending on an outer shape of the target object. In this case, it is highly likely that an avoidance route is set within a region which actually is not a road surface by the automatic steering control, resulting in an improper automatic steering control.

The present invention is made to resolve the problem above. That is, one of objects of the present invention is to provide a road surface detecting apparatus capable of detecting information-indicating-a-road-surface existing in front of a vehicle with a high accuracy.

A road surface detecting apparatus according to the present invention (Hereinafter, this apparatus will be referred to as a "present invention apparatus".) is mounted on a vehicle.

This present invention apparatus comprises;

imaging means (11, step 602) for taking an image of a region in front of the vehicle by means of a stereo camera;

parallax information calculating means (step 604) for calculating, based on a taken image taken by the imaging means (11), parallax information including a parallax of each of pixels composing the taken image;

road surface information acquiring means (step 608) for extracting, based on the parallax information, a pixel corresponding to a road surface from the pixels of the taken image, and acquiring, based on information of the extracted pixel, information-indicating-a-road-surface in three-dimensional coordinate axes as road surface information;

road surface gradient formula calculating means (step 610) for calculating, based on the information-indicating-a-road-surface, a road surface gradient formula ($y = a \cdot z^2 + b \cdot z + c$) by approximating a gradient of the road surface by a quadratic function;

gradient change determining means (step 612) for determining whether or not an absolute value ($|a|$) of a coefficient of a quadratic term of the road surface gradient formula is greater than a predetermined coefficient threshold (Cth); and invalidating means (step 614) for invalidating the information-indicating-a-road-surface when it is determined that the absolute value ($|a|$) is greater than the coefficient threshold (Cth) (step 612: Yes) by the gradient change determining means.

In the present invention apparatus, the road surface gradient formula calculating means calculates, based on information-indicating-a-road-surface (road surface information) acquired by the road surface information acquiring means, a road surface gradient formula by approximating a gradient of the road surface by a quadratic function. Thereafter, the gradient change determining means determines whether or not an absolute value of a coefficient of a quadratic term (that is, a term with a highest degree) of this road surface gradient formula is greater than a predetermined coefficient threshold. The coefficient of the quadratic term of the road surface gradient formula reflects the gradient change of the road surface. More specifically, when a road surface is rising with respect to a current position of a vehicle, this coefficient becomes larger as the gradient change becomes large (that is, as the gradient rapidly changes). On the other hand, when a road surface is depressing with respect to a current position of a vehicle, this coefficient becomes smaller as the gradient change becomes large (that is, as the gradient rapidly changes). Therefore, by determining whether or not an absolute value of this coefficient is greater than the coefficient threshold, it becomes possible to determine whether or not a gradient of a road surface rapidly changes (that is, whether or not the road surface is suitable as a travelling road surface). In the present invention apparatus, the invalidating means invalidates the information-indicating-the-road-surface when the gradient change determining means determines that the absolute value of this coefficient is greater than the coefficient threshold. Thereby, a possibility that information-indicating-a-road-surface not suitable as a travelling road surface due to a rapid change in gradient is detected can be reduced. As a result, information-indicating-a-road-surface existing in front of a vehicle can be detected with a high accuracy. It should be noted that "to invalid information-indicating-a-road-surface" means to set a final detection result that "a road surface has not been detected" to be a state where this result can be output, and does not necessarily mean to erase the information-indicating-the-road-surface (however, does not mean to exclude erasing the information-indicating-the-road-surface, either). Besides, as is obvious from the description above, a word of "coefficient" in the present invention is used in a mathematical meaning.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
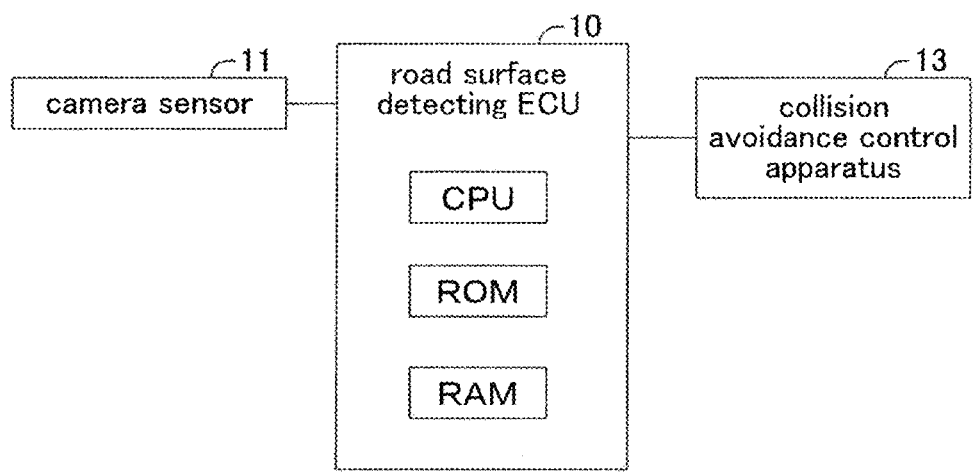
FIG. 1 is a schematic configuration diagram of a road surface detecting apparatus (hereinafter, referred to as an "embodiment apparatus") according to an embodiment of the present invention and a collision avoidance control apparatus connected to the embodiment apparatus.

FIG. 1 is a schematic configuration diagram of a road surface detecting apparatus (hereinafter, referred to as an "embodiment apparatus") according to an embodiment of the present invention and a collision avoidance control apparatus connected to the embodiment apparatus. Hereinafter, a vehicle on which the embodiment apparatus is mounted is referred to as an "own vehicle" in order to distinguish it from other vehicles.

The embodiment apparatus comprises a road surface detecting ECU 10 and a camera sensor 11 connected to the road surface detecting ECU 10. The road surface detecting ECU 10 is connected to a collision avoidance control apparatus 13. ECU is an abbreviation of "Electric Control Unit" and comprises a microcomputer as a main part. The microcomputer includes CPU and storing devices (non-transitory computer-readable storage medium) such as ROM and RAM. The CPU is configured to realize/perform various functions by executing instructions (i.e., programs or routines) stored in the ROM. Hereinafter, the road surface detecting ECU 10 is simply referred to as an "ECU 10".

The camera sensor 11 comprises a vehicle-mounted stereo camera apparatus (illustration omitted) for taking an image in front of the own vehicle. The vehicle-mounted stereo camera apparatus is provided in a vicinity of a middle in a vehicle width direction of a front edge part of a roof of the own vehicle, and comprises a left camera arranged at a left side from a vehicle front-rear axis and a right camera arranged at a right side from the vehicle front-rear axis. The left camera mainly takes an image of a front left side region of the own vehicle every time a predetermined time elapses to output a left image signal indicating a taken left image to the ECU 10. Similarly, the right camera mainly takes an image of a front right side region of the own vehicle every time a predetermined time elapses to output a right image signal indicating a taken right image to the ECU 10.

The ECU 10 detects a road surface existing in front of the own vehicle every time the predetermined time elapses (that is, every time a predetermined calculation interval elapses) by procedures described below. That is, first, the ECU 10 generates a parallax image based on the left image signal and the right image signal output from the camera sensor 11. Next, the ECU 10 estimates whether each of pixels composing this parallax image (Hereinafter, each of these pixels may also be referred to as a "parallax point" as will be described later.) is a parallax point corresponding to a road surface (Hereinafter, such a parallax point is referred to as a "road surface parallax point") or a parallax point corresponding to an obstacle and the like other than the road surface. Subsequently, the ECU 10 performs a three-dimensional coordinate transformation of a road surface parallax point, and acquires the road surface parallax point where the coordinate transformation has been performed as information-indicating-the-road-surface. Thereafter, the ECU 10, based on the information-indicating-the-road-surface, calculates a road surface gradient formula by approximating a gradient of the road surface by a quadratic function to perform a gradient change determination to determine whether or not an absolute value of a coefficient of a quadratic term of this road surface gradient formula is greater than a predetermined coefficient threshold. The ECU 10 determines, based on a determination result of the gradient change determination, whether or not to invalidate the information-indicating-the-road-surface acquired by the aforementioned procedures. When having determined to invalidate the information-indicating-the-road-surface, the ECU 10 outputs to the collision avoidance control apparatus 13 a final detection result that "a road surface has not been detected (the information-indicating-the-road-surface is invalid)". On the other hand, when having determined not to invalidate the information-indicating-the-road-surface, the ECU 10 outputs to the collision avoidance control apparatus 13 this information-indicating-the-road-surface as a final detection result. Thereby, the road surface is detected.

The collision avoidance control apparatus 13 is connected to non-illustrated other ECUs and acquires from these other ECUs following information such as whether or not there exist any obstacles in front of the own vehicle, and when exists, a relative position, a relative direction, and a relative speed of the obstacle with respect to the own vehicle. The collision avoidance control apparatus 13 calculates, based on these information, a time-to-collision to this obstacle (a time expected to be required for the own vehicle to collide with this obstacle), and determines, based on the time-to-collision, whether or not to perform a collision avoidance control. It should be noted that the collision avoidance control is a control to perform at least one of following controls, that is, a warning control for raising a warning to a driver, an automatic braking control for automatically applying a braking force on the vehicle, and an automatic steering control for automatically changing a steered angle of a steered wheel of the vehicle. Each of these controls is performed when there exists an obstacle in front of the vehicle with a possibility of colliding with the vehicle.

When having determined to perform the collision avoidance control, the collision avoidance control apparatus 13 determines, based on the final detection result transmitted from the ECU 10, which control(s) (that is, the warning control, the automatic braking control, and/or the automatic steering control) of the collision avoidance control to perform. Specifically, when acquired a final detection result that "a road surface has not been detected (the information-indicating-a-road-surface is invalid)", the ECU 10 performs at least one control among two controls other than the automatic steering control. On the other hand, when acquired the information-indicating-the-road-surface as a final detection result, the ECU 10 performs at least one control among three controls including the automatic steering control. For example, the ECU 10 determines a type of controls based on the time-to-collision.

(Operation Detail)

Next, a detailed description about an operation of the embodiment apparatus will be made. It should be noted that a method for generating a parallax image and a method for estimating a road surface parallax point have been known, and thus only simple descriptions will be made for these methods. For more details, refer to the Japanese Patent Application Laid-Open (kokai) No. 2016-206776 (U.S. Unexamined Patent Application Publication No. 2016305785).

<Generation of a Parallax Image>

The ECU 10 of the embodiment apparatus generates a parallax image based on the left image signal and the right image signal output from the camera sensor 11 every time the predetermined time (calculation interval) elapses during a period (hereinafter, also referred to as an "engine on period") from a timing at which a non-illustrated engine switch (an ignition key switch) of the own vehicle has been changed into an on state to a timing at which the engine switch is to be changed into an off state. For example, a method of Semi-Global Matching may be used for generating the parallax image. Each of pixels (each of parallax points) composing the parallax image is associated with parallax information including a parallax thereof.

<Estimation of a Road Surface Parallax Point>

Figure 2A:
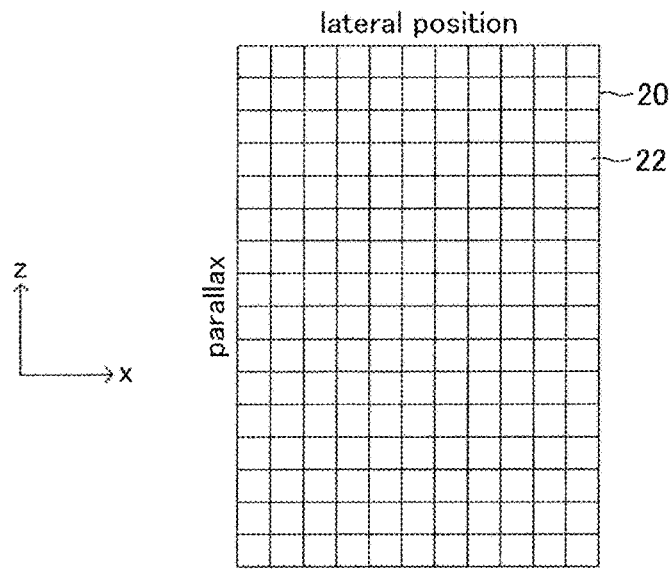
FIG. 2A is a plan view of a parallax vote map.
Figure 2B:
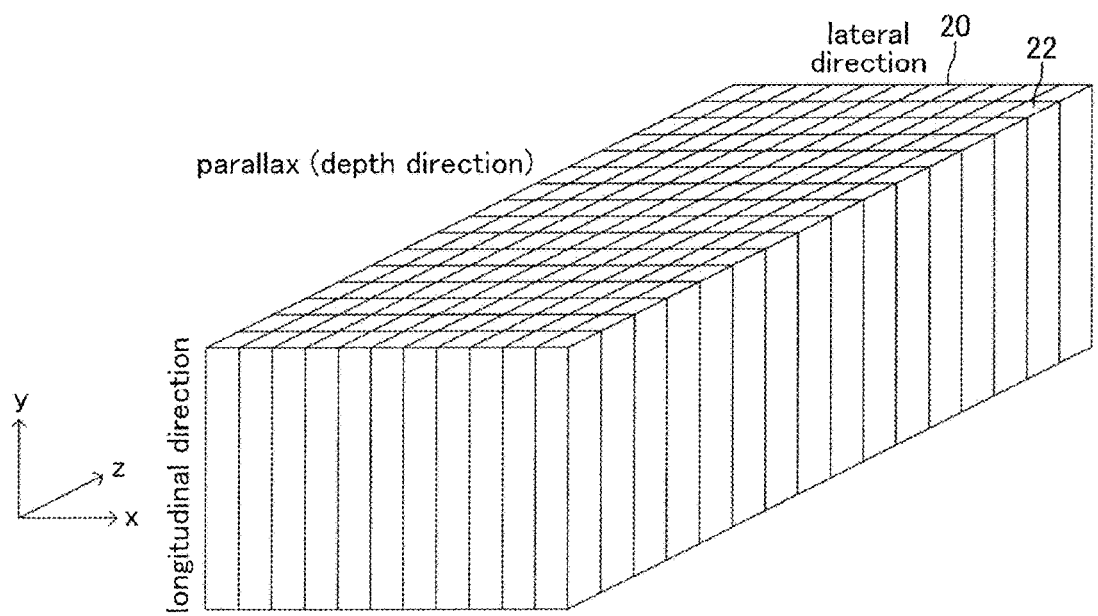
FIG. 2B is a perspective view of the parallax vote map.

The ECU 10 estimates whether each parallax point in the parallax image is a road surface parallax point or a parallax point other than a road surface parallax point every time the predetermined time elapses during the engine on period. Hereinafter, one example of an estimation method will be briefly described. FIG. 2A shows a plan view of a parallax vote map 20, and FIG. 2B shows a perspective view of the parallax vote map 20. The parallax vote map 20 is provided in advance in the RAM. As shown in FIG. 2A and FIG. 2B, the parallax vote map 20 comprises a plurality of rectangular parallelepiped blocks 22 arranged in such a manner that each edge in a lateral direction corresponds to a position in the lateral direction (the vehicle width direction) of the parallax image, each edge in a longitudinal direction corresponds to a position in the longitudinal direction of the parallax image, and each edge in a depth direction corresponds to a magnitude of a parallax.

The ECU 10 sets an attribute of a road surface or an attribute other than a road surface for each of the blocks 22 of the parallax vote map 20. Specifically, the ECU 10 votes (classifies) each of the parallax points in the parallax image to a corresponding block 22 of the parallax vote map 20 based on a position of each of the parallax points (a position in the lateral direction and a position in the longitudinal direction) and a magnitude of each of parallaxes thereof. Thereafter, the ECU 10 calculates, for each of the blocks 22 of the parallax vote map 20, an average value of the parallaxes, a deviation of the parallaxes, an average value of coordinates of the parallax points in the longitudinal direction of the parallax image, and a deviation of coordinates of the parallax points in the longitudinal direction of the parallax image.

Figure 3:
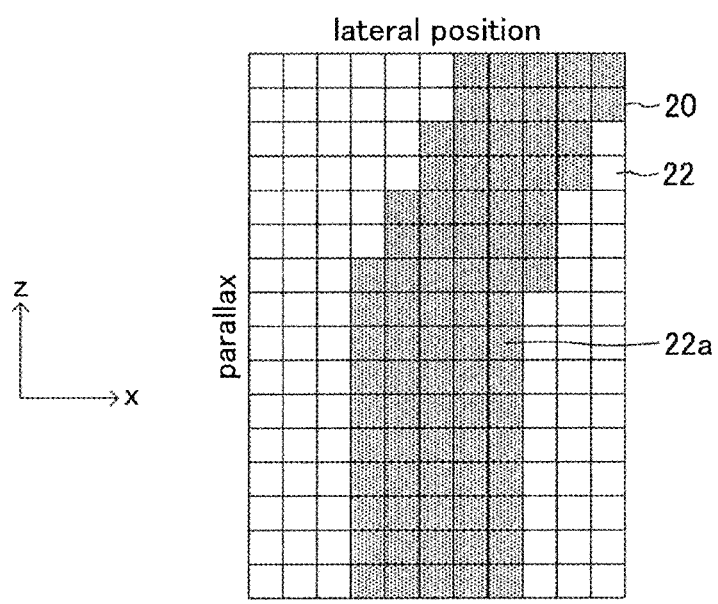
FIG. 3 is a diagram showing a parallax vote map where an attribute is set for each block.

When parallax points, each of which having a parallax (distance) with a similar magnitude, are distributed in a narrow range in the longitudinal direction of the parallax image and the positions of these parallax points in the longitudinal direction of the parallax image are smoothly rising as the parallax decreases (that is, as a distance from the own vehicle increases) in blocks 22 of the parallax vote map 20, the ECU 10 determines that a group of these parallax points indicates a road surface. Specifically, when following two conditions, that is, a condition that a distribution range in the longitudinal direction of the parallax points is less than a first threshold and a condition that a distribution range in the parallax direction of the parallax points is more than or equal to a second threshold are satisfied, the ECU 10 sets, as shown in FIG. 3, an attribute of a road surface for each of blocks 22 where these parallax points are classified. Hereinafter, a block 22 for which an attribute of a road surface is set is referred to as a "road surface block 22a". On the other hand, for a block 22 where a distribution of the parallax points does not satisfy the aforementioned two conditions, an attribute other than a road surface (for example, an attribute of an obstacle) is set. In FIG. 3, for each of the blocks other than the road surface blocks 22a among the blocks 22, an attribute other than a road surface is set.

The ECU 10 estimates a parallax point classified into the road surface block 22a as a road surface parallax point and estimates a parallax point classified into a block 22 other than the road surface block 22a as a parallax point other than a road surface parallax point. The ECU 10 stores a coordinate (u, v) of each of the road surface parallax points in the parallax image in the RAM thereof. It should be noted that u and v denote a component in the lateral direction and a component in the longitudinal direction of a coordinate of a parallax point in the parallax image, respectively.

<Acquisition of Road Surface Information>

The ECU 10 acquires information-indicating-a-road-surface as a road surface information based on road surface parallax points every time the predetermined time elapses during the engine on period. Specifically, the ECU 10 transforms a coordinate (u, v) of each of the road surface parallax points in the parallax image to a three-dimensional coordinate (z, x, y) in accordance with following equations (1) to (3). Herein, z, x, y denote a component in the depth direction (a direction of the vehicle front-rear axis), a component in the lateral direction (the vehicle width direction), and a component in a height direction, respectively. It should be noted that this height direction corresponds to the longitudinal direction of the parallax image and the parallax vote map 20. In addition, in the following equations, B denotes a distance between the left camera and the right camera of the camera sensor 11 (a distance between optical axes), f denotes a focal distance of these cameras, and d denotes a parallax included in parallax information associated with a parallax point. That is, the ECU 10 acquires the information-indicating-a-road-surface by transforming each of the road surface parallax points in the parallax image to a three-dimensional coordinate. The ECU 10 stores the transformed three-dimensional coordinates of the road surface parallax points in the RAM thereof.

$$z = B \cdot f / d \quad (1)$$

$$x = u \cdot f / z \quad (2)$$

$$y = v \cdot f / z \quad (3)$$

<Calculation of Road Surface Gradient Formula>

Figure 4:
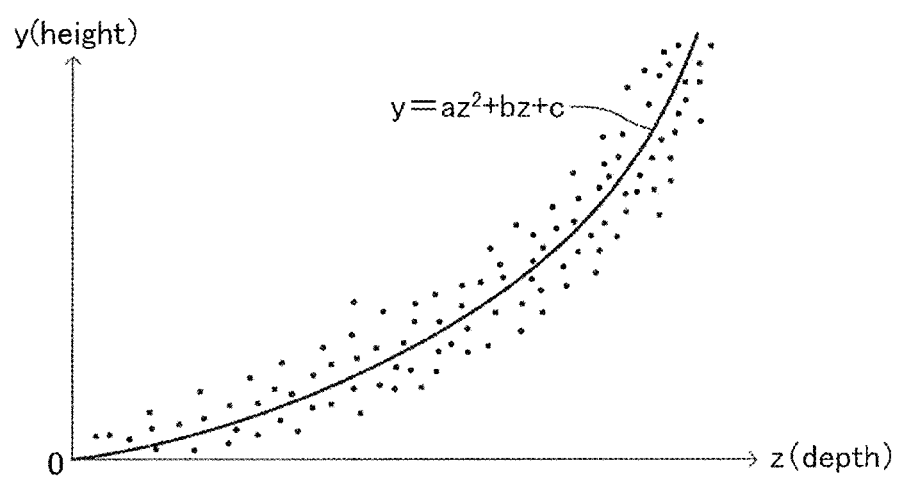
FIG. 4 is a graph defining a relationship between a distance in a depth direction (z direction) and a distance in a height direction (y direction) of each of road surface parallax points when a position of a vehicle is set as a reference, and is a diagram showing a road surface gradient formula acquired by approximating a group of points on the graph by a quadratic function.

The ECU 10 calculates a road surface gradient formula by approximating a gradient of a road surface existing in front of the own vehicle by a quadratic function based on the information-indicating-a-road-surface every time the predetermined time elapses during the engine on period. Specifically, as shown in FIG. 4, the ECU 10 generates a graph defining a relationship between a distance in the depth direction (z direction) and a distance in the height direction (y direction) of each of the road surface parallax points when a position of the own vehicle is set as a reference. In this graph, a lateral axis represents the z direction and a longitudinal axis represents the y direction. This graph is generated by plotting z components and y components of coordinates of all of the road surface parallax points in the parallax vote map 20.

After plotting the road surface parallax points on the graph, the ECU 10 approximates, by using M estimation of least-squared method, a group of the points on the graph by a quadratic function ($y = a \cdot z^2 + b \cdot z + c$. A, b, and c are constant values calculated by the M estimation.) and calculates this approximated formula as a road surface gradient formula. It should be noted that as is obvious from the aforementioned description, a road surface gradient formula is a formula determined based on a z component (a component in the depth direction) and a y component (a component in the height direction) of a coordinate of each of the road surface parallax points, and an x component (a component in the lateral direction) is not considered. That is, a road surface gradient formula is generated on a premise that "heights of a road surface at positions with same distances in the depth direction are substantially constant in the lateral direction". It should be noted that a method for approximating a group of the points on the graph is not limited to the M estimation, but for example, L estimation or R estimation may be used, or methods other than the least-squared method may be used. The ECU 10 stores the calculated road surface gradient formula in the RAM thereof.

<Gradient Change Determination>

A gradient change of the road surface is reflected on a coefficient a of a quadratic term (a term with a highest degree) of the road surface gradient formula ($y = a \cdot z^2 + b \cdot z + c$). When the road surface is rising with respect to the current position of the own vehicle, the coefficient a becomes larger as the gradient change becomes large (that is, as the gradient rapidly changes). On the other hand, when the road surface is depressing with respect to the current position of the own vehicle, the coefficient a becomes smaller (that is, the coefficient is negative and an absolute value thereof becomes larger) as the gradient change becomes large (that is, as the gradient rapidly changes). A road surface, a gradient thereof changing too rapidly in an upward or a downward direction is not suitable as a travelling road surface for the own vehicle. Thus, the ECU 10 performs, by means of the road surface gradient formula, a gradient change determination to determine whether or not the gradient change of the road surface existing in front of the own vehicle is suitable as the travelling road surface every time the predetermined time elapses during the engine on period.

Specifically, the ECU 10 determines whether or not an absolute value |a| of the coefficient of the quadratic term of the road surface gradient formula ($y = a \cdot z^2 + b \cdot z + c$) is greater than a predetermined coefficient threshold Cth. When having determined that the absolute value |a| is greater than the coefficient threshold Cth (|a|>Cth), the CPU determines that the gradient change is not suitable for the travelling road surface since the gradient of the road surface rapidly changes (in other words, since the gradient of the road surface becomes drastically steep) toward a forward direction of the own vehicle. On the other hand, when having determined that the absolute value |a| is less than or equal to the coefficient threshold Cth (|a|≤Cth), the CPU determines that the gradient change is suitable for the travelling road surface since the gradient of the road surface does not change rapidly toward the forward direction of the own vehicle. The ECU 10 stores this determination result in the RAM thereof. It should be noted that the coefficient threshold Cth may be calculated by an experiment, a simulation, and the like.

<Invalidation of Road Surface Information>

The ECU 10 determines whether or not to invalidate the road surface information based on the determination result of the gradient change determination every time the predetermined time elapses during the engine on period. Specifically, when having determined that the gradient change of the road surface is not suitable as the travelling road surface by the gradient change determination at a certain calculation timing, the ECU 10 determines that the road surface information includes "information indicating a region with a low possibility of actually being a road surface" and invalidates this road surface information. In this case, the ECU 10 outputs to the collision avoidance control apparatus 13 the final detection result that "a road surface has not been detected (the road surface information is invalid) at this calculation timing". On the other hand, when having determined that the gradient change of the road surface is suitable as the travelling surface by the gradient change determination at a certain calculation timing, the ECU 10 determines that the road surface information does not include "the information indicating a region with a low possibility of actually being a road surface" and does not invalidate this road surface information. In this case, the ECU 10 regards this road surface information as the road surface information detected at this calculation timing and outputs this road surface information to the collision avoidance control apparatus 13 as the final detection result. The ECU 10 stores the final detection result of the road surface information in the RAM thereof.

Figure 5A:
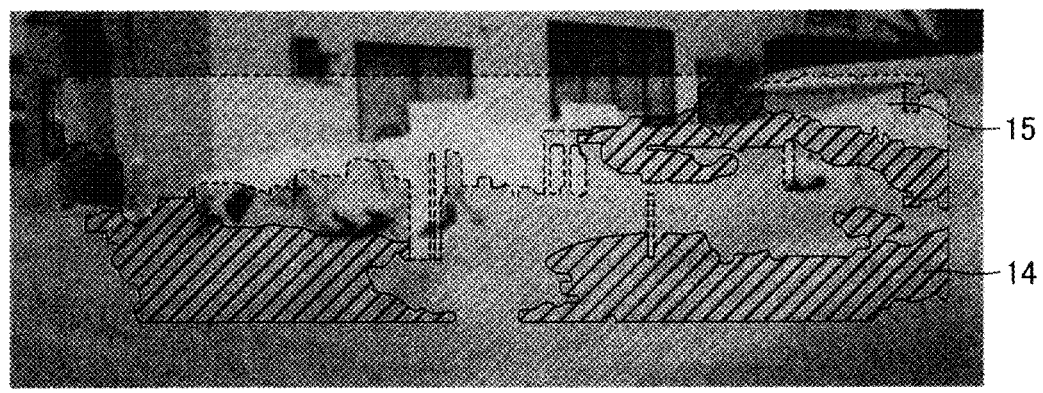
FIG. 5A is a diagram showing a detection result of road surfaces and obstacles before a gradient change determination is performed at a certain calculation timing.
Figure 5B:
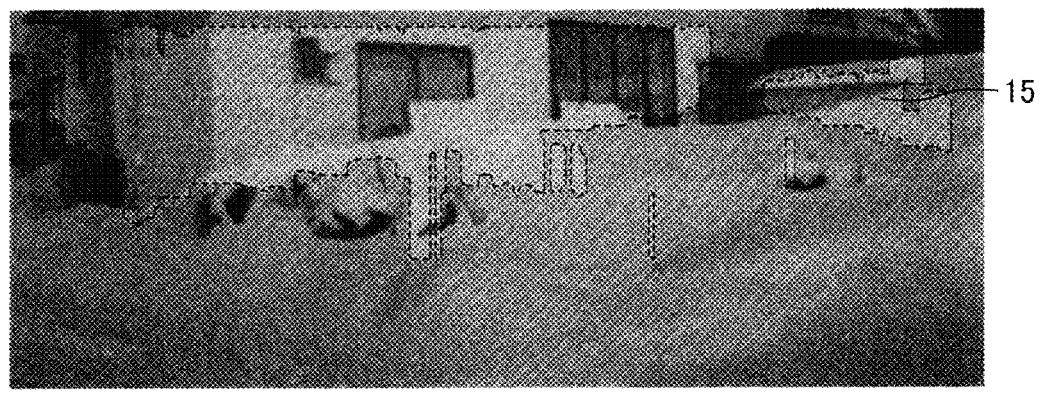
FIG. 5B is a diagram corresponding to FIG. 5A and showing a state where road surface information has been invalidated after the gradient change determination is performed at a certain calculation timing.

A specific description about this point will be made, referring to FIG. 5A and FIG. 5B. FIG. 5A shows a detection result of a road surface 14 and an obstacle 15 before the gradient change determination is performed at a certain calculation timing. That is, the road surface 14 is a region corresponding to the road surface information acquired through a process of the aforementioned <Acquisition of road surface information>. On the other hand, the obstacle 15 is an obstacle detected by means of a known method. Since a method for detecting the obstacle 15 is known, a detailed description will be omitted (for a detailed description, refer to the Japanese Patent Application Laid-Open (kokai) No. 2013-161434). As shown in FIG. 5A, in this taken image, snow is accumulated by snow removal in such a manner that the snow covers obstacles, and the accumulated snow moderately joins with a region of actually being a road surface. At this calculation timing, a part of the accumulated snow has been detected as the road surface 14.

The ECU 10 calculates a road surface gradient formula for the road surface 14 at this calculation timing and performs the gradient change determination based on this road surface gradient formula. In this example, a gradient change of the accumulated snow is relatively large and therefore an absolute value $|a|$ of a coefficient of a quadratic term of the road surface gradient formula is greater than the coefficient threshold Cth. Thus, the ECU 10 determines at this calculation timing that the gradient change of the road surface 14 is not suitable as the travelling road surface and invalidates information-indicating-the-road-surface 14 (that is, determines that the information-indicating-the-road-surface 14 includes the information indicating a region with a low possibility of actually being a road surface). FIG. 5B corresponds to FIG. 5A and shows a state where the information-indicating-the-road-surface 14 has been invalidated after the gradient change determination is performed at this calculation timing. As shown in FIG. 5B, a road surface has not been detected at this calculation timing. This state shows a final detection result of a road surface at this calculation timing.

(Actual Operation)

Next, an actual operation of the ECU 10 will be described. The CPU of the ECU 10 is configured to perform, during the engine on period, a routine shown by a flowchart of FIG. 6 every time the predetermined time (the calculation interval) elapses.

Figure 6:
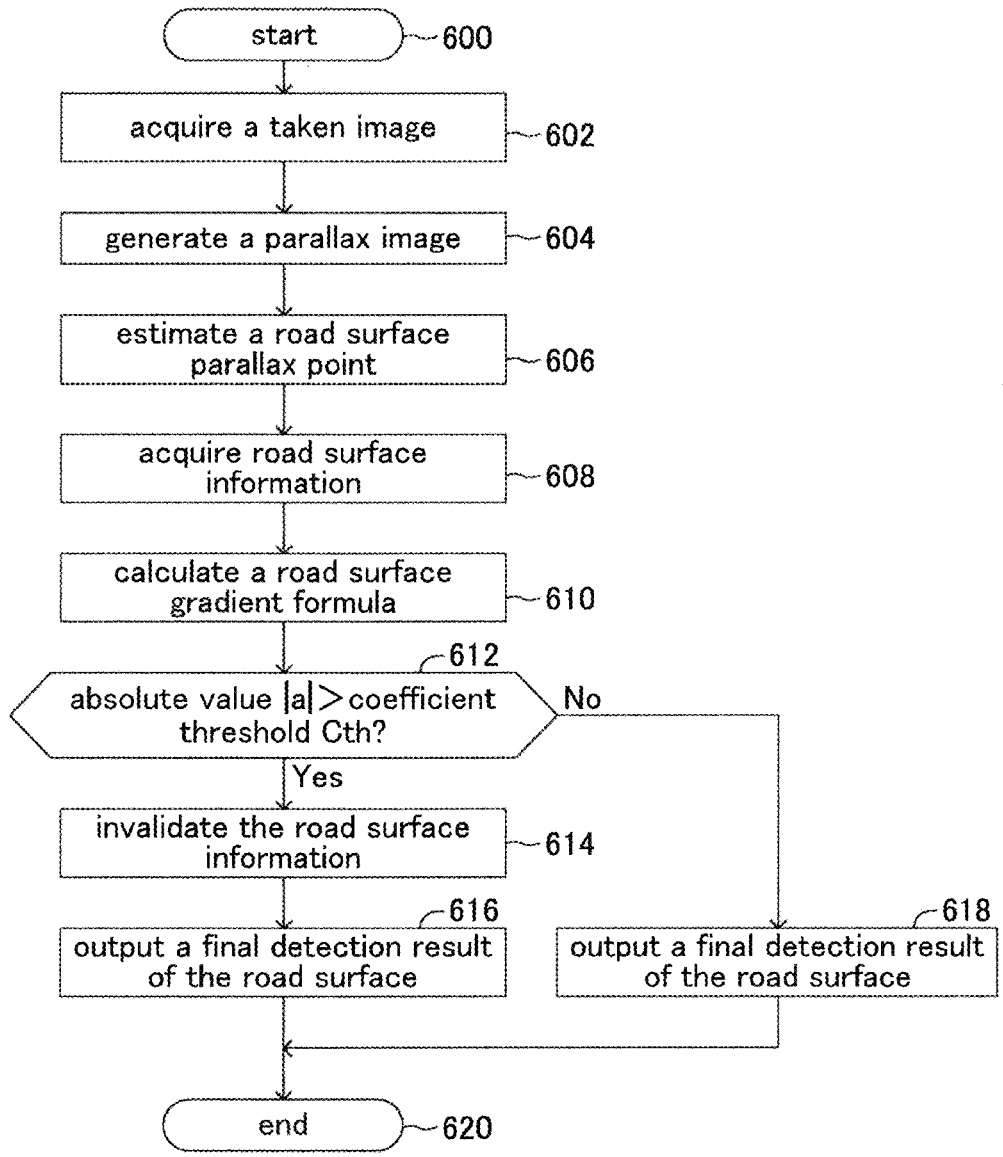
FIG. 6 is a flowchart showing a routine performed by CPU of road surface detecting ECU of the embodiment apparatus.

When the engine switch is changed to the on state, the CPU starts processing from a step 600 in FIG. 6 and performs processing of following steps 602 to 610 in order.

Step 602: the CPU receives a left image signal and a right image signal from the camera sensor 11. That is, the CPU acquires a taken image including a left image and a right image.

Step 604: the CPU generates a parallax image from the taken image.

Step 606: the CPU estimates whether each of the parallax points in the parallax image is a road surface parallax point or a parallax point other than the road surface parallax point.

Step 608: the CPU acquires road surface information based on the road surface parallax points.

Step 610: the CPU calculates a road surface gradient formula based on the road surface information.

Subsequently, the CPU proceeds to a step 612 to perform the gradient change determination to determine whether or not an absolute value $|a|$ of a coefficient of a quadratic term of the road surface gradient formula is greater than the predetermined coefficient threshold Cth. When having determined that $|a|>Cth$ is satisfied, the CPU makes an "Yes" determination (that is, determines that a gradient change of the road surface is not suitable as the travelling route) at the step 612 and performs processing of following steps 614 and 616.

Step 614: the CPU determines that the road surface information acquired at the step 608 includes information indicating a region with a low possibility of actually being a road surface to invalidate this road surface information.

Step 616: the CPU outputs to the collision avoidance control apparatus 13 a final detection result that "a road surface has not been detected (the road surface information is invalid) at this calculation timing". As a result, the collision avoidance control apparatus 13 does not select the automatic steering control as the collision avoidance control but performs at least one of the warning control and the automatic breaking control.

In contrast, when having determined that $|a| \leq Cth$ is satisfied at the step 612, the CPU makes a "No" determination (that is, determines that the gradient change of the road surface is suitable as the travelling route) at the step 612 to perform processing of a following step 618.

Step 618: the CPU regards the road surface information acquired at the step 608 as road surface information detected at this calculation timing and outputs this road surface information to the collision avoidance control apparatus 13 as a final detection result.

After finishing the processing of the step 616 or the step 618, the CPU proceeds to a step 620 to tentatively terminate the present routine.

Effects of the embodiment apparatus will be described. The ECU 10 of the embodiment apparatus calculates the road surface gradient formula by approximating the gradient of the road surface existing in front of the own vehicle by a quadratic function, and determines whether or not the absolute value $|a|$ of the coefficient of the quadratic term (that is, a term with a highest degree) of this road surface gradient formula is greater than the coefficient threshold Cth. The coefficient a of the quadratic term of the road surface gradient formula reflects the gradient change of the road surface. More specifically, when the road surface is rising with respect to the current position of the own vehicle, this coefficient a becomes larger as the gradient change becomes large (that is, as the gradient rapidly changes). On the other hand, when the road surface is depressing with respect to the current position of the own vehicle, this coefficient a becomes smaller as the gradient change becomes large (that is, as the gradient rapidly changes). Therefore, by determining whether or not the absolute value $|a|$ of this coefficient is greater than the coefficient threshold Cth, it becomes possible to determine whether or not the gradient of the road surface rapidly changes (that is, whether or not the road surface is suitable as the travelling road surface for the own vehicle). When having determined that $|a|>Cth$ is satisfied, the embodiment apparatus invalidates the road surface information acquired at this calculation timing. Thereby, a possibility that information-indicating-a-road-surface not suitable as the travelling road surface due to a rapid change in gradient is detected can be reduced. As a result, information-indicating-a-road-surface existing in front of the own vehicle can be detected with a high accuracy.

In addition, a conventional road surface detecting apparatus (hereinafter, referred to as a "prior art apparatus") had a following problem. That is, in general, when having detected an obstacle, the prior art apparatus is configured not to perform a determination of whether or not a region at a deep/far side in a vehicle travelling direction of this obstacle (hereinafter, simply referred to as a "behind region") is a road surface (in other words, configured not to regard a behind region as a target of the determination). For example, when having detected a curbstone as an obstacle, the prior art apparatus is configured not to perform the determination of whether or not a behind region of the curbstone is a road surface.

For example, in a case where snow is accumulated during snow removal in such a manner that the snow covers an obstacle and the accumulated snow moderately joins with a road surface, even though a gradient change of the accumulated snow is relatively large, the prior art apparatus may detect the accumulated snow not as an obstacle but as a road surface. In this case, a region which was not a target of the determination of whether or not the region is a road surface before the snow was accumulated (that is, a region behind the obstacle) becomes a target of the determination of whether or not the region is a road surface. Therefore, if the region behind the obstacle is relatively flat, there is a possibility that the prior art apparatus may detect this behind region as a road surface as well, resulting in falsely detecting a region of actually not being a road surface as a road surface.

For instance, in a case where a curbstone is provided at a side of a road with a curved shape and snow is accumulated over this curbstone to be detected as a road surface, a behind region thereof (a region of actually not being a road surface) becomes a target of the determination of whether or not the region is a road surface. Herein, if this behind region is relatively flat, this region is detected as a road surface. As a result, it was highly likely that an avoidance route is set within a region of actually not being a road surface by the automatic steering control, resulting in an improper automatic steering control.

In contrast, the present embodiment apparatus determines, based on a gradient change of a road surface, whether or not to invalidate the information-indicating-this-road-surface. Therefore, for example, even though snow is accumulated in such a manner that the snow covers an obstacle and as a result, an outer shape of the obstacle has changed, a possibility that the accumulated snow is finally detected as a road surface is extremely low since a gradient change of the accumulated snow is likely to be relatively large. In a case where the accumulated snow is detected as an obstacle, as mentioned above, a region behind the obstacle is not a target of a determination of whether or not the region is a road surface. Therefore, it is prohibited that the behind region is detected as a road surface, and thus a probability that a region of actually not being a road surface is detected as a road surface can be significantly reduced. On the other hand, in a case where accumulated snow is detected as an indistinct region, even though a region behind the accumulated snow is detected as a road surface, it is less likely that an avoidance route is set over this indistinct region when the automatic steering control is performed. Hence, in this case as well, a possibility that a region of actually not being a road surface is detected as a road surface can be significantly reduced.

The road surface detecting apparatus according to the present embodiment has been described. However, the present invention is not limited to the aforementioned embodiment and may adopt various modifications within a scope of the present invention.

For example, in the aforementioned embodiment, when it is determined that |a|>Cth is satisfied by the gradient change determination at a certain calculation timing, the embodiment apparatus invalidates the road surface information and outputs to the collision avoidance control apparatus 13 the final determination result that "a road surface has not been detected (the road surface information is invalid) at this calculation timing". However, a configuration is not limited thereto. For instance, the embodiment apparatus may identify a group of the road surface parallax points having a steep gradient change based on a distribution shape of the road surface parallax points transformed to three-dimensional coordinates in a z-y graph. Thereafter, the embodiment apparatus may remove the group of the road surface parallax points and if there still exists a rest group of the road surface parallax points (that is, a group of the road surface parallax points having a moderate gradient change), the embodiment apparatus may output this group of the road surface parallax points to the collision avoidance control apparatus 13 as a final road surface information. In other words, the embodiment apparatus may perform a re-detection of a road surface after invalidating the road surface information by the gradient change determination. This configuration facilitates a detection of a "travelable" road surface even when it is determined that the gradient change is steep. Therefore, it can be suppressed that the automatic steering control is not selected because of a road surface not being detected, which enables more proper driving support control.

In addition, the embodiment apparatus may weight each of the road surface parallax points as follows when acquiring the road surface information. That is, the embodiment apparatus may estimate, based on a vehicle speed, a yaw rate, and the like, a travelling expected route which is a route on which the own vehicle is expected to travel and may weight each of the road surface parallax points, depending on a distance thereof to the travelling expected route such that a road surface parallax point is more heavily weighted as the distance becomes close (refer to the Japanese Patent Application Laid-Open (kokai) No. 2016-206776). Thereafter, the embodiment apparatus may acquire the road surface information by performing the three-dimensional coordinate transformation described above based on the weighted road surface parallax points and may perform the gradient change determination based on this road surface information.

Further, a function used to calculate (acquire) the road surface gradient formula is not limited to a quadratic function. For example, a polynomial function may be used to approximate a gradient of a road surface to calculate (acquire) the road surface gradient formula.

The invention claimed is:
1. A road surface detecting apparatus mounted on a vehicle comprising;
   a stereo camera configured to take images of a region in front of said vehicle; and
   an electronic control unit (ECU) configured to:
     calculate, based on a taken image taken by said stereo camera, parallax information including a parallax of each of pixels composing said taken image;

extract, based on said parallax information, a pixel corresponding to a road surface from said pixels of said taken image;

acquire, based on information of said extracted pixel, information-indicating-a-road-surface in three-dimensional coordinate axes as road surface information;

calculate, based on said information-indicating-a-road-surface, a road surface gradient formula by approximating a gradient of said road surface by a quadratic function;

determine whether an absolute value of a coefficient of a quadratic term of said road surface gradient formula is greater than a predetermined coefficient threshold; and invalidate said information-indicating-a-road-surface when it is determined that said absolute value is greater than said coefficient threshold.

2. A road surface detecting apparatus mounted on a vehicle comprising;

a stereo camera configured to take stereo images of a region in front of said vehicle;

a processor;

a non-transitory computer-readable storage medium; and a set of computer-executable instructions stored on said computer-readable storage medium that cause said processor to implement:

calculating, based on a stereo image taken by said stereo camera, parallax information including a parallax of each of pixels composing said stereo image;

extracting, based on said parallax information, a pixel corresponding to a road surface from said pixels of said stereo image;

acquiring, based on information of said extracted pixel, information-indicating-a-road-surface in three-dimensional coordinate axes as road surface information;

calculating, based on said information-indicating-a-road-surface, a road surface gradient formula by approximating a gradient of said road surface by a polynomial function;

determining whether or not an absolute value of a coefficient of a term with a highest degree of said road surface gradient formula is greater than a predetermined coefficient threshold; and invalidating said information-indicating-a-road-surface when it is determined that said absolute value is greater than said coefficient threshold.

3. A non-transitory computer-readable storage medium having computer-executable instructions, said instructions comprising;

acquiring a set of images of a region in front of a vehicle, said set of images being taken by a stereo camera;

calculating, based on said set of images, parallax information including a parallax of each of pixels composing said set of images;

extracting, based on said parallax information, a pixel corresponding to a road surface from said pixels of said set of images;

acquiring, based on information of said extracted pixel, information-indicating-a-road-surface in three-dimensional coordinate axes as road surface information;

calculating, based on said information-indicating-a-road-surface, a road surface gradient formula by approximating a gradient of said road surface by a polynomial function;

determining whether or not an absolute value of a coefficient of a term with a highest degree of said road surface gradient formula is greater than a predetermined coefficient threshold; and invalidating said information-indicating-a-road-surface when it is determined that said absolute value is greater than said coefficient threshold.

\* \* \* \* \*